Oct. 27, 1964   J. L. WENTZ ETAL   3,154,751
NON-RESONANT LASER CRYSTAL STRUCTURE FOR AMPLIFIER
Filed Sept. 7, 1962

JOHN L. WENTZ
LEWIS H. STRAUSS
INVENTORS

ATTORNEY

{ # United States Patent Office

3,154,751
Patented Oct. 27, 1964

3,154,751
NON-RESONANT LASER CRYSTAL STRUCTURE FOR AMPLIFIER
John L. Wentz and Lewis H. Strauss, Baltimore County, Md., assignors to Aircraft Armaments, Inc., Cockeysville, Md., a corporation of Maryland
Filed Sept. 7, 1962, Ser. No. 222,237
4 Claims. (Cl. 330—4.3)

This invention relates to laser crystals, and more particularly to laser crystals for amplifying an injected light beam.

It is well known that the gain of a laser crystal, that is the ratio of the output intensity to the input intensity, is a function of the energy stored in the crystal when the later is in a metastable state, the reflectivity of the crystal surface, and the volume of the crystal. Increasing the stored energy by increasing the population inversion tends to increase the gain, but practical considerations limit the power and temperature of the excitation source with the result that the maximum amount of stored energy is fixed to a large degree by the equipment being used. Once the equipment is operating at its peak, some other variable must be adjusted if the gain is to be increased.

Because the reflectivity of the crystal surface affects the amount of light that is internally reflected during spontaneous emission when the crystal is in an excited state, and thus controls the start of oscillations that destroy the ability of the crystal to amplify, it is desirable to keep the reflectivity as low as possible. Those skilled in the art conventionally resort to increasing the path length of the injected light beam in the crystal in order to achieve increased gain. With a given excitation source, this is accomplished by increasing the crystal length, along which the input light is to be injected, and decreasing the diameter in order to maintain the same crystal volume and the same stored energy per unit volume. However, growing and fabricating long crystals to obtain desired gains is extremely expensive; and beyond certain lengths, highly impractical. It is therefore an object of this invention to produce a laser crystal for amplifying a light beam wherein means are provided for increasing the path length without increasing the crystal length while minimizing the danger of oscillations.

Briefly, the present invention accomplishes the desired results by a combination of surface condition and inclination of the end faces relative to the optical axis of the laser. The cylindrical surface of the crystal is made generally diffuse by finely grinding but not polishing the surface, and the polished end faces are plane, parallel and inclined relative to the laser axis. On the diffuse cylindrical surface of the laser crystal is provided a plurality of locally reflective areas arranged to intercept a light beam injected into the crystal through a polished end face and multiply reflect the same back and forth across the crystal until it emerges amplified through the other end face. Thus, instead of passing axially along the laser crystal, as in conventional amplifiers, the light beam transversely crosses the crystal a plurality of times making the light path length in the crystal, and the gain, substantially larger than the path and gain in a conventional crystal. The locally reflective areas do not significantly affect the overall reflectivity of the outer cylindrical surface of the crystal with the result that the surface condition does not impede entry of stimulation light. However, because of the inclined end faces and the generally diffuse surface condition on the cylindrical surface of the crystal, photons emitted spontaneously when the crystal is in its excited state tend to be scattered on striking the diffuse surface rather than reflected back and forth within the crystal. This greatly reduces the probability that the crystal will break into self-oscillation when in the excited state. A conventional crystal with a finely ground cylindrical surface that is provided with a plurality of locally reflective areas is characterized in this description as a crystal with a generally diffuse surface.

Still other objects, features, and attendant advantages will become apparent to those skilled in the art from a reading of the following detailed description of several physical embodiments constructed in accordance with the invention taken in conjunction with the accompanying drawings wherein.

Figure 1:
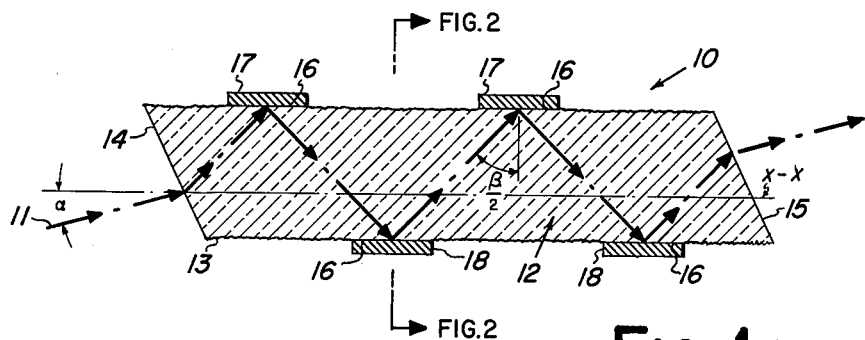
FIGURE 1 is a side view in section of a crystal having the present invention incorporated therein.

A laser crystal 10 for amplifying an injected light beam 11 is shown in FIGURE 1 as a cylindrical rod 12 having a finely ground cylindrical surface 13 and polished end faces 14, 15 that are, in the illustrative embodiment, plane, parallel and inclined relative to the laser axis $x$—$x$ of the rod. The condition of surface 13 is exaggerated in the drawing for purposes of illustration. The inclination of the faces is such that the projected area of one face on the plane of the other face does not overlie the latter.

Rod 12 is a crystal which exhibits laser qualities, such as pink ruby, etc. Such crystal is transparent to injected light of a predetermined wavelength and is excitable by a source (not shown) to a metastable state above the ground state by an amount of energy that is the same as the energy of light at the wavelength of the injected light.

It is conventional to inject the light to be amplified by the laser action of the crystal into polished end face 14 of the crystal and to recover the amplified light from polished end face 15. Surface 13 is purposely made diffuse to reduce the generation of oscillations due to spontaneous emission. The diffuse surface requires the stimulation source to be of greater energy than if surface 13 were polished, but the output of a crystal of this type is confined to a narrower cone angle and is freer from spurious modes because of the suppression of specular reflection from the surface of the rod. The inclination of surfaces 14 and 15 relative to the laser axis tends to reduce the possibility that photons spontaneously emitted when the crystal is in its metastable state, will be reflected back and forth through the crystal to the point where oscillaion occurs thereby destroying the effectiveness of the crystal to operate as an amplifier. Such photons will be scattered by the diffuse surface rather than reflected.

Figure 2:
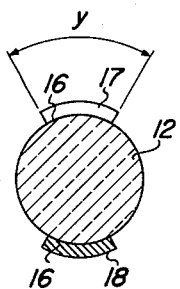
FIGURE 2 is a section taken along the line 2—2 of FIGURE 1.

A plurality of locally polished areas 16 are provided on diametrically opposed axial lines on the cylindrical surface 13 of the crystal as shown in FIGURE 2. Areas 16 on one axial line are staggered relative to areas 16 on the opposite line as shown in FIGURE 1 so that they do not overlie each other. A reflective coating 17, 18 is provided on areas 16. Areas 16 and coatings 17, 18 are oriented relative to each other and end faces 14 and 15, so that input light beam 11 is admitted at face 14, multiply reflected by coatings 17, 18 down the laser axis, and is passed out of the crystal at face 15. If the angle of incidence of the light beam on reflective surfaces 16, 17, 18 is $\beta/2$, $n$ is the number of such surfaces on the crystal, and $d$ is the crystal diameter; then the path length L of the multiply reflected beam is:

$$L = \frac{(n)(d)}{\cos \beta/2}$$
}

Since the length of the crystal $l$ is related to the number of reflecting surfaces by:

$$l = (n)(d) \tan \beta/2$$

then the ratio of the light path length to the crystal length is given by:

$$\frac{L}{l} = (\sin \beta/2)^{-1}$$

It should be noted that the angle of incidence, $\beta/2$ is directly related to the deviation $\alpha$ of beam 11 from the laser axis of the crystal. Thus, the axial length of surfaces 16, 17, 18 is kept such that opposite surfaces do not overlie each other thereby reducing the chance of oscillations due to internal reflections of photons created during spontaneous emission when the crystal is in its excited state. Likewise, the transverse width of surfaces 16, 17 is at an included angle $\gamma$ less than 90°.

Figure 3:
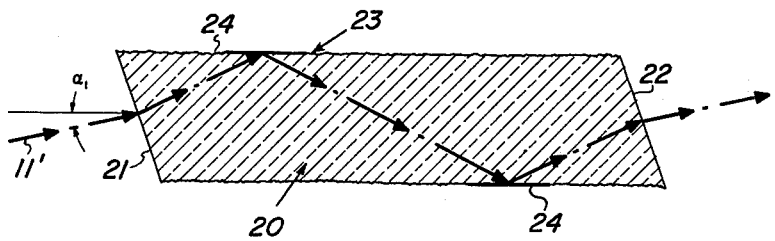
FIGURE 3 is a side view in section of another embodiment of the present invention.

Another embodiment of the invention is shown in FIGURE 3. Here, crystal 20 has ground and polished end faces 21, 22 that are plane, parallel and inclined relative to the laser axis of the crystal. Cylindrical surface 23 of the crystal is generally diffuse and is provided with a plurality of locally polished areas 24 which rely for internal reflectivity primarily on the angle of incidence of the light beam as it sequentially strikes each such polished area. The angle of injection $\alpha$, is chosen less than the critical angle of incidence so that beam 11' is admitted to the interior of the crystal and refracted so that polished surface 24 intercepts the beam within the crystal at an angle greater than the critical angle of incidence. The beam is thus totally internally reflected within the crystal. The process is repeated until the beam is intercepted by face 22 at an angle less than the critical angle of incidence and thus passes exterior to the crystal.

With both embodiments above described, it is important to note that the cylindrical crystal surface is generally diffuse for effecting efficient entry of the stimulating light without the danger of promoting self-oscillation due to internal reflections resulting from spontaneous emission. However, the provision of locally polished surfaces along the crystal length does not significantly decrease the absorption of the excitation energy or increase the danger of the crystal breaking into oscillations, while it does provide a simple and effective way to substantially increase the crystal gain.

An added advantage of the present invention is that the size of the locally reflective areas can be adjusted to pass only the fundamental mode of the incident light beam and reject the higher order modes. In this manner, the laser crystal has incorporated into it a Fraunhofer mode selector.

In summary, it is pointed out that the most important aspect of this invention is the effect the crystal has on both injected photons that enter the crystal from the exterior, and photons spontaneously emitted inside the crystal when the latter is in its excited state. The angle of injection is chosen such that the path of any injected photon in the crystal is essentially fixed. That is, due to surfaces 16, 17 practically all photons entering the crystal eventually leave. Those reflected from end face 15, and those photons spontaneously emitted are scattered and cannot cause the crystal to break into self-oscillation. The latter result is due to the fact that photons reflected from end face 15 will strike diffused surface 13 because there is no projection of one end face on the other. In other words, photons cannot be reflected back and forth along the optical axis of the crystal since the geometrical configuration of the crystal end faces coupled with the generally diffuse surface cooperate in limiting the factors contributing to the build-up of self-oscillations. The staggering of the reflective surfaces 16, 17 and their relatively small area in comparison to the total outer surface of the crystal serve to prevent the transverse reflection of photons.

What is claimed is:

1. An amplifier for a light beam, comprising:
   a laser crystal body;
   said body having a generally ground-but-not-polished external surface interrupted at staggered positions along one dimension thereof by a series of spaced apart non-overlying locally polished reflecting areas disposed in staggered relation on opposite side walls of said external surface;
   the external surface of said laser body having polished non-mutually-reflecting light entrant and exit apertures disposed respectively adjacent the effectively opposite ends of said series of sequentially reflecting areas and adapted to transmit light to and from a respectively adjacent one of said staggered reflecting areas.

2. Apparatus according to claim 1 where said laser crystal body is a cylindrical rod, said staggered locally polished reflecting areas being disposed along the cylindrical external surface of said rod, and being arcuate in form.

3. Apparatus according to claim 1 wherein said staggered locally polished reflecting areas have a reflective coating thereon, said ground-but-not-polished external surface being devoid of reflective coating.

4. Apparatus according to claim 1, the angle of incidence formed between each respective said reflecting area and an imaginary line of reflection sequentially connecting said staggered reflecting areas being greater than the critical angle of incidence for total internal reflection within said crystal body, and each of said entrant aperture and exit aperture intercepting said imaginary line of reflection at an angle less than the critical angle of incidence.

References Cited by the Examiner

UNITED STATES PATENTS 2,692,952  10/54  Briggs _____ 250—83.3

OTHER REFERENCES

"Advances in Quantum Electronics," edited by Singer, Columbia University Press, 1961, New York, pages 267–275 (article by Mergerian et al.).

ROY LAKE, *Primary Examiner.*